United States Patent [19]
Lemanski

[11] 3,813,971
[45] June 4, 1974

[54] QUICK CHANGE TOOL HOLDER

[76] Inventor: Savarian F. Lemanski, 109 Taylor Ave., Detroit, Mich. 48202

[22] Filed: May 30, 1972

[21] Appl. No.: 258,097

[52] U.S. Cl. .................................. 82/36 R, 29/97
[51] Int. Cl. ...................... B23b 29/00, B26d 1/00
[58] Field of Search............ 82/36, 36 A, 36 B, 37; 29/97

[56] References Cited
UNITED STATES PATENTS

| | | | |
|---|---|---|---|
| 946,024 | 1/1910 | Thompson | 82/36 A |
| 1,419,967 | 6/1922 | Henning | 29/97 |
| 1,951,488 | 3/1934 | Newton | 29/97 |
| 2,368,736 | 2/1945 | Wyrick | 82/36 A |
| 2,502,274 | 3/1950 | Pearce et al. | 82/36 R |
| 3,602,077 | 4/1971 | Mitchell | 82/36 R |
| 3,662,445 | 5/1972 | Whitaker | 29/97 |

Primary Examiner—Harrison L. Hinson
Attorney, Agent, or Firm—Hulbert & Kelknap Whittemore

[57] ABSTRACT

The two-part tool holder comprises a pair of block-like body members, one a main member at which the holder is fixedly attached to a machine tool support, and the other an auxiliary or secondary body member. These members have means enabling them to be quickly and easily clamped releasably in side-by-side relation to one another, comprising a rotary wedge device carried by the auxiliary part, which device includes an enlarged wedge head operatively engageable in parallel undercuts of the main body part, thus to exert lateral wedging force drawing the holder parts tightly together. Supplemental swing arm clamps complete the releasable interlock of the main and body components in assembly. Each of the latter has provisions to mount machining cutters of various types in a way to project from opposite ends or sides thereof. Importantly, the two body parts include means enabling the same to be mounted in 180° reversed positions in relation to one another, thereby enabling the tool elements to be operationally brought into play on a workpiece without necessarily dismounting the entire composite holder from the machine tool.

10 Claims, 7 Drawing Figures

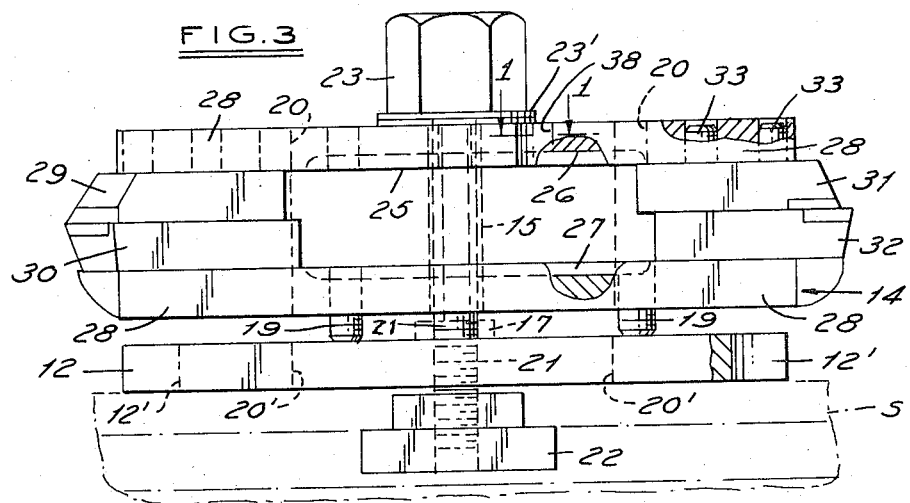
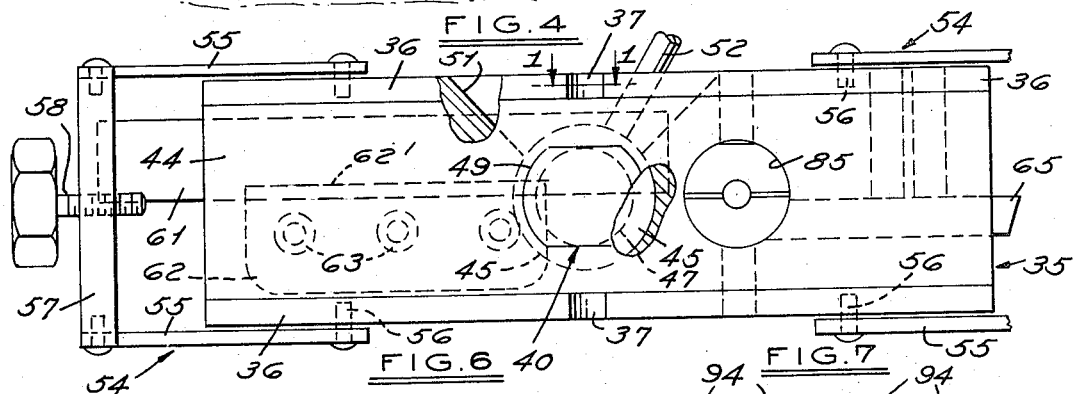
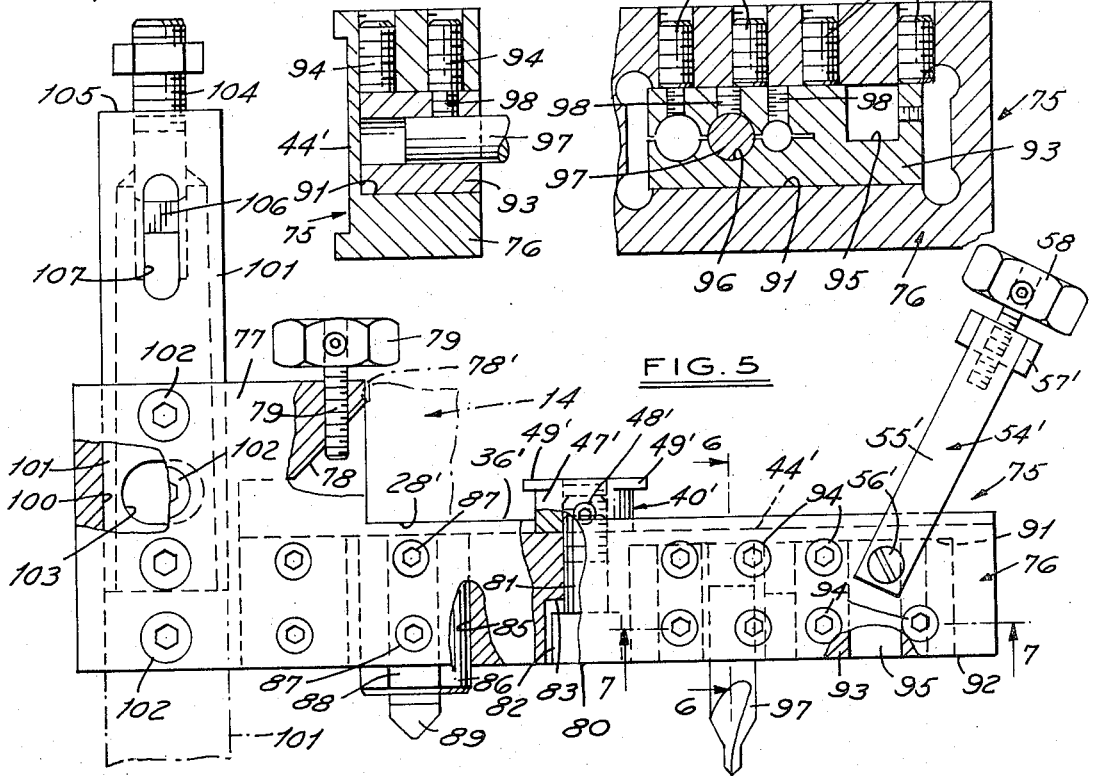

QUICK CHANGE TOOL HOLDER

BACKGROUND OF THE INVENTION — FIELD

The quick change tool holder of the invention is widely applicable in machine tool operations, these including the conventional lathe-turning of external and internal workpiece surfaces by boring, reaming, threading, chamfering, knurling or cut-off, also other more-or-less similar cutting operations of a planing or shaping nature. However, installations of all types are contemplated. I an unaware of other art dealing with a quick change tool holder having structural features as referred to in the Abstract.

SUMMARY OF THE INVENTION

In the industrial machining of workpieces, a source of lost time and operator inconvenience is the "down" time which elapses when a given type cutting tool must be removed and replaced by another type, or replaced upon being discarded, by another identical or alternate kind of tool. The cutter must usually be re-mounted to the holder, ordinarily in an orientation accurately related to the setting of the replaced tool. All of this is time-consuming and, to a considerable extent, exacting in regard to the skill of the operator.

The improved tool holder enables multiple cutters to be variously and optionally mounted on one or the other, or both, of two main and auxiliary body members, which are then accurately located unfailingly in a desired relationship. Once positioned side-by-side and locked strongly to one another, a remounting of the holder, as to one or both of its parts, to the basic machine tool enables a cutting tool or tools to be brought into play on a workpiece in a minimum of overall elapsed time.

BRIEF DESCRIPTION OF THE DRAWINGS

FIG. 3 is a side elevational view of the main tool body member as viewed from the direction of the arrow 3 in FIG. 2, being also broken and vertically sectioned, this view showing a conventional type of mount of the main body member, hence of the assembled main or master and secondary members, to a machine tool support;

FIG. 4 is a fragmentary side elevational view of the secondary or auxiliary body member from the direction of the arrow 4 in FIG. 2, being partially broken away and vertically sectioned on line 4—4 of FIG. 1, and with clamp components retracted to inoperative position — and it is to be noted that (solely for clarity) FIGS. 3 and 4 show certain locating or registering provisions of the body members as laterally displaced from the positions appearing in FIG. 1;

FIG. 5 is a top plan view of a modified type of auxiliary body member for use in association with the main or master body member illustrated in FIGS. 1, 2 and 3, this view being partially broken away and in horizontal section in a longitudinal center plane of the member, also showing various typical cutters as mounted operationally on the auxiliary member;

FIG. 6 is a view in transverse vertical section, as on line 6—6 of FIG. 5, of a portion of the holder member; and FIG. 7 is a fragmentary view in vertical longitudinal section on line 7—7 of FIG. 5, detailing an adjustable holder block feature.

DESCRIPTION OF PREFERRED EMBODIMENTS

Figure 1:
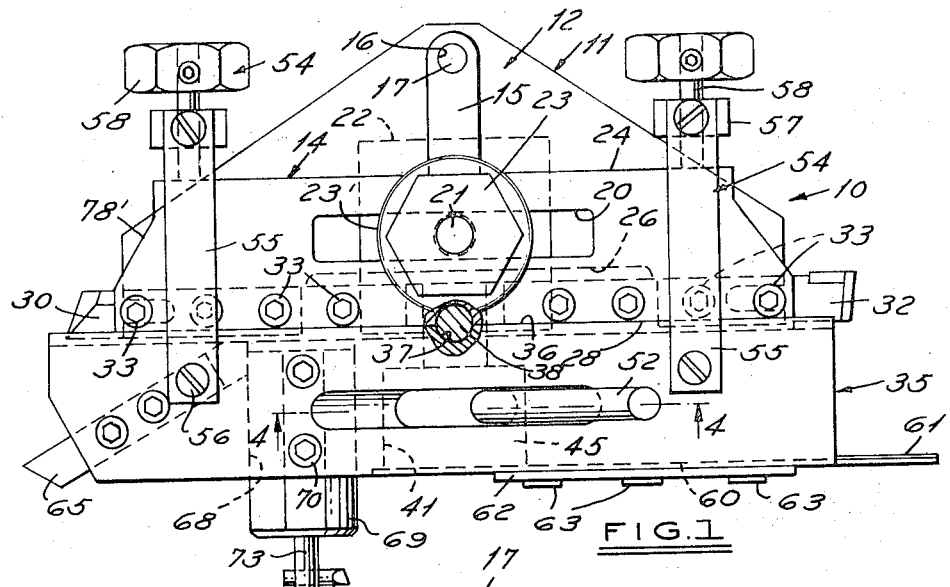
FIG. 1 is a top plan view of one preferred embodiment of the tool holder, showing its main and secondary body members as rigidly clamped to one another and presenting various cutting elements for turning or other machining operation, the view being partially broken away and horizontally sectioned on a line corresponding to line 1—1 of FIGS. 3 and 4.

As typically illustrated in FIGS. 1-5, inclusive, a composite quick-change tool holder in accordance with the invention, as generally designated 10, comprises a main tool holder part 11 having a separate supporting foot or base 12 of substantial area. The latter is of a generally truncated-triangular outline in plan, and rigidly supports thereabove, in spaced relation thereto, a massive, block-like upper body member, generally designated 14. For this purpose, member 14 carries an integral, rearwardly extending rib or flying buttress element 15 which is vertically drilled and tapped at 16 to threadedly receive the shank of an upright, hex-headed bolt 17. Bolt 17 is fixed on base 12 adjacent the rear apex of the latter. Further means, such as a pair of heavy set screws 19 threadedly engaged in tool body member 14 and bearing downwardly upon the top of base 12, assist in affording the necessary rigid and distortion-resistant mount of body member 14 above base 12; and such means may be otherwise still further supplemented, if desired, as at slotted ends 12' of the base.

Figure 2:
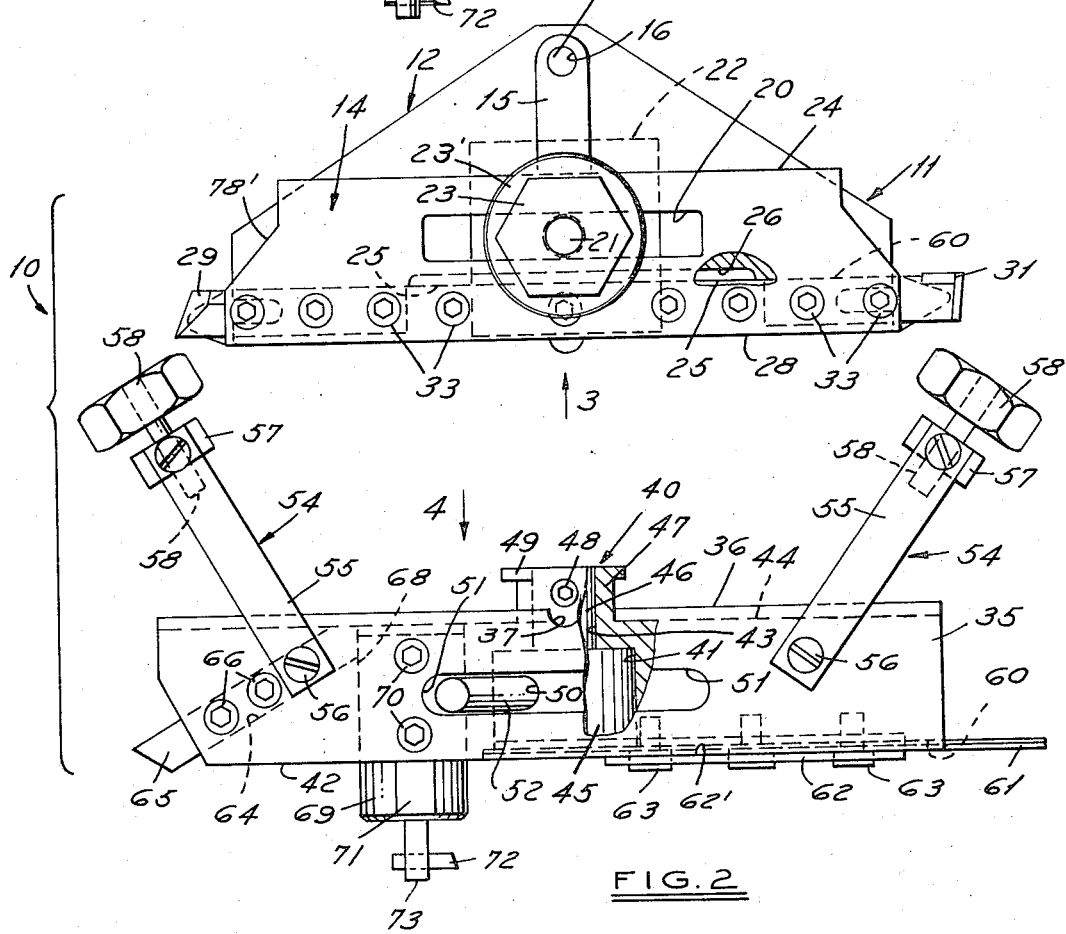
FIG. 2 is an exploded top plan view illustrating the separated body members with supplemental clamping components thereof in a withdrawn position, the view being partially broken away and horizontally sectioned.

The main, primary or master body member 14 is formed to provide an elongated vertical slot 20 therethrough paralleling an inner upright side surface thereof and the base 12 has a correspondingly shaped slot 20' in register directly beneath slot 20. These openings receive with liberal side clearance the upright stud-shank 21 of a mounting post threadedly engaged downwardly in a square bottom foot 22. The latter is slidably received for longitudinal adjustment in an undercut slot of a machine tool slide S (illustrated in dot-dash line in FIG. 3) or other corresponding support, fixed or movable in nature, usually but not necessarily of a lathe-type or other machine tool; equivalent mounting arrangements of this sort are well known in the art. By preference, the top of mounting stud 21 fixedly carries an enlarged hex head 23; and the latter, with washers 23' intervening between it and the main body member 14, and stud 21 threading into the foot 21, enables the holder 10 as a whole to be taken up tightly in a properly adjusted setting on the basic machine tool. As illustrated in FIGS. 1 and 2, the body member 14 has a flat rear upright surface 24 for engagement by certain clamp means to be described.

As best illustrated in FIG. 3, the main or master body member 14 is provided, on and throughout the length of a forward or inner portion thereof which faces an auxiliary tool holding body member (to be described), with a horizontally elongated recess 25 of substantial front-to-rear depth; and this recess is, in turn, further relieved rearwardly at its top and bottom by a pair of longitudinal undercuts 26, 27. These are spaced rearwardly from the upright side wall of tool holder body member 14 in which the recess 25 is formed, i.e., spaced by the depth of that recess.

As indicated, the milled slotting of the body member at 25 extends the full length of member 14, being defined by parallel upper and lower side shoulders 28; and the end spaces between these formations receive typical lathe-type turning or threading cutter bits 29, 30, 31 and 32. These are locked in place by any one or more of a number of Allen-type set screws 33 taking threadedly into the material of body member 14 above the upper shoulder 28; and the exact nature of cutters 29–32 will vary, although overall vertical and transverse horizontal dimensions thereof will preferably afford a reasonably close tolerance sliding fit between the shoulders 28.

The secondary or auxiliary tool mounting body member of tool holder 10, which member is generally designated by the reference numeral 35, presents upright inner, vertically spaced and horizontally elongated face portions or lands at 36, which lands engage side land surfaces of the shoulders 28 of the main tool holder body member 14. They are in flush contact with the latter along the length of the respective members 14, 35, save for a short intermediate zone at which the face lands 36 are provided with vertically aligned, half-cylindrical recesses 37 in which a half-round protuberance or semi-cylindrical side formation on master body part 14 is matingly engaged optionally. Typically the protuberance 38 may be represented by a short cylindrical length fixedly carried, as by brazing, in a half-round indentation in the upper shoulder land 28 of main body member 14. This lateral interfit of members 14 and 35 at the protuberance 38 fixedly locates them in proper front-to-rear register with one another, in which register the members are wedgingly interlocked initially by means to be described. Thus, without interfering at all with the vertical interface zone between the respective horizontal lands 28, 36 in which a portion of such wedge interlocking means operates, the auxiliary tool holder body member 35 may be reversed 180° in a vertical plane from the relationship depicted in FIG. 1, for example, in order to make available a different cutter or cutters on one or the other of the base parts 14, 35. A truly located register of those members is preserved, but with cutter elements thereon reversed and able to be brought into play for a different type of machining operation on a workpiece.

The invention contemplates the mentioned initial wedging interlock of members 14, 35 with one another by means of a rotary wedge interlock device which is generally designated by the reference numeral 40, and which is best illustrated in FIGS. 2 (lower portion) and 4. A corresponding arrangement for a modified type of secondary mounting body is shown in FIG. 5.

To this end, the block-like body member 35 is provided with a cylindrical seat 41 opening at 90° through the outer upright side wall 42 thereof; and a reduced-diameter counter-bore 43 of this seat extends rearwardly through the inner surface of member 35. This is a longitudinally recessed sub-surface 44 lying between the upper and lower land surfaces 36 of member 35 at which the half-round locating recesses 37 are formed.

A cylindrical barrel member 45 of wedging device 40 mates within the cylindrical seat 41, and has an inner, reduced diameter, coaxial neck portion 46 which is rotatively received in the counterbore 43. Neck 46 in turn has a wedging head 47 fixedly pinned thereon in flush overlapping relation to the adjacent recessed surface 44, as through the agency of a radial set screw 48; and head 47 has a pair of diametrically opposite wedging lips 49 integrally formed thereon, each outlined as a segment of a circle. These are a bit wedge-tapered from one side to the other thereof.

Accordingly, with the holder body members 14, 35 located in register with one another, and with the wedging lips 49 disposed vertically between the upper and lower vertical undercuts 26, 27 of the main tool holder body member 14, a rotation of less than 90° of the device 40 will cause the latter's lips 49 to wedgingly interengage in said undercuts, thrusting at 90° to the interface plane of engagement of members 14, 35 with one another. This affords an initial and very strong lock of those members to one another in the operative position appearing in FIG. 1.

Again referring to FIGS. 2 and 4, one means of so rotating the device 40 is by forming its barrel 45 as a capstan-like rotor element, i.e., equipped with a circumferentially spaced series of radially extending holes 50, and by a longitudinal mill-slotting, as at 51, through the upper surface of block-like body member 35, into communication with the bore or seat 41 in which the barrel 45 is received. The slotting 51 will be of flared V-shape permitting access of an operating rod 52 to a radial hole 50 in capstan barrel 45, thereby enabling a considerable arc of swing of rod 52 as a tool in rotatively wedging the lips 49 of wedging head 47 in the main body member undercuts 26, 27.

The thus achieved locking action is supplemented and greatly increased in strength and rigidity over an operating period by means of a pair of similar clamp bails 54, each having parallel legs 55 pivotally mounted adjacent one end to an outer horizontal surface of auxiliary tool holder member 35, as at a bolt or screw 56. The opposite ends of legs 55 are appropriately spanned by a block-like cross piece 57, which threadedly receives a hex-headed clamp stud 58 at a mid-point thereof. Accordingly, when an initial interlock of parts 14 and 35 has been made by the wedging device 40, it may be supplemented by swinging the locking bails 54 from an inoperative position thereof, as indicated in FIGS. 2 and 4, to the operative position of FIG. 1, in which the clamp studs or bolts 58 are then threadedly taken downwardly into clamping engagement adjacent opposite ends of the rear surface of main tool holder body member 14.

The secondary or auxiliary tool holder member 35 is typically shown in FIGS. 1, 2 (bottom portion) and 4, as being provided on its outer upright and transverse side surface 42 with an elongated horizontal recess or groove 60 in which is matingly engaged an elongated cut-off blade 61. A side clamp plate 62 engages laterally against blade 61, the plate 62 being rabbeted horizontally at 62' along its upper edge so as to upwardly overlap the lower edge and side of the blade 61. The thicker lower portion of clamp plate 62 beneath its rabbet 62' is adequately recessed into body portion to enable set screws 63 extending through openings in this thicker plate portion to take into tapped openings in the body 35. Upon backing off of such screw or screws the cut-off blade 61 may be adjusted as desired as to its distance projecting from the corresponding end of body 35, then rigidly screw-clamped in that position.

The opposite end of secondary holder body member 35 is shown as being provided with an angled broached through-hole 64 extending from an end to the recessed surface 44 of the body. This hole may receive a turning or threading cutter 65, which is releasably clamped in adjusted place by set screws 66 tapped into the top of body member 35. This end of body member, as well as the opposite end, may also be equipped with further means for mounting a conventional or special type cutter (not shown).

In addition, the forward or exposed surface 42 of holder may be provided with a horizontal cylindrical bore 68 to adjustably receive a cylindrical tool holder block 69. Top set screws 70, as tapped into holder body 35, engage a land 71 on block 69 to hold the latter in an adjusted position projecting transversely outwardly of the body surface 42. An appropriate small boring or reaming tool 72 is fixedly carried on a 90° mounting rod 73, which, in turn, is fixedly mounted in a center bore of block 69. Of course, as indicated above, any or all of these types of cutter may be omitted, or suitably replaced by another type.

FIGS. 5, 6 and 7 illustrate an alternate version of auxiliary or secondary tool body member, generally designated by the reference numeral 75. It differs structurally from the version 35, in that it is equipped with but a single pivoted clamp bail unit like the units 54 of holder member 35, which unit is designated in this instance by the reference numeral 54'. Components thereof are designated by primed numerals to the extent that such parts correspond to those of the unit 54.

FIG. 5 shows the auxiliary holder 75 as being generally L-shaped in top plan as to its massive, block-like body member 76, the latter carrying an integral rear extension formation 77 at one end thereof, which formation is shaped to nestingly engage with a formation of the main holder body 14. To that end member 76 has an undercut angled surface 78 extending into the extension 77, the surface 78 mating against a similarly angled surface of body 14, as specially designated 78' in FIGS. 1, 2 and 5. A hex-headed clamp stud or bolt 79 is threadedly engaged in a tapped bore in body member formation 77, being adapted to project through the latter's surface 78 and clampingly engage surface 78' of body member 14. This action is, of course, supplemented by the clamp effort exerted by the clamping bail unit 54' on surface 24 of member 14; and both efforts of course are exerted following an initial wedging clamp-up of the members 14, 76 to one another.

A wedging unit 40', which is generally similar to the device 40 of the embodiment 10, serves to thus initially interlock the secondary body member with the main or master body subassembly; and inasmuch as the wedging arrangement 40' generally corresponds to that on auxiliary body member 35 of the first embodiment, components thereof are, again, designated by corresponding reference numerals, primed, and further description in detail is unnecessary.

However, it may be noted that the wedge device 40' is in this case operated by a hex-headed bolt 80 whose threaded shank 81 and head 82 extend through the front-to-rear width of body member 76 proper, the end of the shank being set-screw or otherwise fixedly secured in the head portion 47' of the device 40', which portion overlaps and bears against the recessed rear body member surface 44'. The hex-head 82 of the wedge device is received in a counter-bore 83 of the hole receiving the bolt shank 81. This head is preferably an Allen type, and, as operated in this fashion, the mildly tapered wedge lips or ears 49' releasably wedge in the upper and lower undercut formations 26, 27 in the main body member 14, exactly as previously described, to effect the initial interlock of the body parts.

Typically, the elongated portion of auxiliary tool holder body member 76 will be provided with a cylindrical through-bore 85 to slidably and adjustably receive a generally cylindrical tool holder barrel 86, with Allen set screws 87 engaging from above in a flat or land 88 formed on the barrel. The latter is broached in rectangular section to nestingly receive a turning or threading cutter 89; and such cutter is in turn additionally held in place in an adjusted setting relative to holder barrel 86 by set screws (not shown) threaded upwardly from the bottom of holder body member 76.

In further accordance with the holder body embodiment 75, the member 76 is provided adjacent the right hand end thereof (FIGS. 5 and 7) with an elongated and forwardly exposed recess 91 of rectangular outline, this recess extending a substantial depth into the holder body member 76 from an exposed side surface 92 of the latter, but bottoming short of the opposite recessed surface 44' of the body part. As best shown in FIG. 7, the horizontally elongated recess 91 receives a multiple-tool holder block 93 of rectangular or regular hexahedron cross-section, but substantially less length than the recess, which block has a slidably adjustable fit between top and bottom walls of recess 91. Block clamping set screws 94, as threaded into the top of body 76, engage the top of multi-tool block 93 to lock the same in an adjusted position in body recess 91.

As typically shown in FIG. 7, the block 93 is provided with a rectangularly sectioned, broached cross-recess 95 to receive one type of turning or threading cutter (not shown) with an end set screw clamping the cutter in place. Similarly, the mounting block 93 is contemplated as having a plurality of circular horizontal through bores 96 of different diameter, in one of which a center drill 97 is shown as being adjustably received, with a small set screw 98 acting from above to clamp this tool in place.

In addition, the enlarged extension formation 77 of holder body member 76 is shown as provided with a cylindrical and horizontal through-bore 100 adjustably receiving an elongated tubular sleeve or chuck 101 having a mildly tapered internal wall. Any one of four vertical set screws 102 that are threaded in formation 77 will clamp the chuck 101 in a longitudinally retracted, inoperative position, as shown in solid line in FIG. 5, the screw of one or another thereof engaging for this purpose on a mildly arcuate land or seat formation 103 of chuck 101. A hex-head bolt 104 is slidably received in a rear end of the check, the bolt head 106 non-rotatably engaging the interior of that member. Bolt 104 thus serves as a drift pin which, when struck from the rear, will dislodge a tool holder collet or tapered tool shank (not shown) from chuck 101. The latter has elongated slots 107 punched in diametrically opposite sides thereof, in which the lower end of a set screw 102 may be engaged to lock the chuck, and a cutter mounted thereby (not shown), against rotation in any one of extended, operative positions as suggested in dot-dash line in FIG. 5.

What is claimed is:

1. A quick change tool holder comprising a pair of main and secondary holder members, said members being bodily separable in their entireties from one another and being each provided with means to releasably mount thereon a plurality of cutters for optional operation on a workpiece, means to releasably mount said main holder member on a machine tool support, and wedge means for quickly releasably clamping said secondary holder member in operative side-to-side interface engagement with said main member, thus enabling the holder members to be releasably sustained as a unit on said support, the secondary member being optionally removable from the main member, and variously replaced thereon for operation of another cutter on the workpiece, said wedge-clamping means comprising a wedging head rotatably mounted on said secondary holder member on an axis normal to said interface zone, said main holder member having a formation wedgingly engaged by said head upon rotation of the latter to releasably interlock the members, said wedge-clamping means further comprising at least one clamping device pivotally mounted on said secondary holder member to swing from an inoperative position to an operative position on the side of the main holder member opposite the main member, said device having means for releasable clamping engagement with the main member in said operative position of the device.

2. The holder of claim 1, in which said main holder member has means to mount cutters releasably on ends thereof opposite one another in relation to the interface zone of side-to-side engagement of the members with one another.

3. The holder of claim 1, in which said means of said secondary member for mounting said cutters presents the latter in a position projecting from an exposed side thereof spaced from its side at said interface zone.

4. The holder of claim 1, in which there are at least two of said clamping devices pivotally mounted on said secondary holder member and engageable at said means of the device with said main holder member.

5. The holder of claim 1, in which but one clamping device is pivotally mounted on said secondary holder member and engageable at said means of the device with said main holder member, and further clamp means on said secondary member releasably engageable with the main member to supplement the clamping effect of said device.

6. The holder of claim 3, as combined with at least one of said side-projecting cutters, in which said secondary holder member has an elongated recess in said exposed side thereof, and a mounting block adjustable longitudinally and releasably clamped in said recess, in which block said one side-projecting cutter is releasably clamped.

7. The holder of claim 3, as combined with at least one of said side-projecting cutters, in which said secondary holder member has a transverse through-bore in which said one side-projecting cutter is releasably clamped.

8. The holder of claim 7, in which said side-projecting cutter has a tubular chuck fixedly mounting the same, said chuck being releasably clamped in said through-bore in an axially adjusted position transverse of the secondary holder member.

9. The holder of claim 1, in which said releasable mounting means includes a member clampingly engaging said machine tool support to secure the holder thereon, and means enabling a sliding adjustment of at least one of said holder members relative to the support in a longitudinal direction of said interface engagement of the holder members.

10. The holder of claim 9, in said member of said mounting means is an upright stud part, said one of said holder members having an elongated slot receiving said stud part to enable said sliding adjustment.

* * * * *